United States Patent [19]

Bancroft et al.

[11] Patent Number: 5,596,547
[45] Date of Patent: Jan. 21, 1997

[54] PRESTACK SEISMIC MIGRATION

[76] Inventors: John C. Bancroft, 6928 Silversprings Road NW, Calgary, Alberta, Canada, T3B 3P8; Hugh D. Geiger, 1908 46th Avenue SW, Calgary, AB, Canada, T2T 2R7

[21] Appl. No.: 546,320

[22] Filed: Oct. 20, 1995

[51] Int. Cl.$^6$ .............................. G01V 1/36; G01V 1/28
[52] U.S. Cl. .................................. 367/51; 367/50
[58] Field of Search .................... 367/50, 51, 73, 367/52

[56] References Cited

U.S. PATENT DOCUMENTS 5,500,832  3/1996  Berryhill ........................... 367/51

OTHER PUBLICATIONS

G. H. F. Gardner, et al., "Dip Moveout and Prestack Imaging", 1986 Offshore Technology Conference, pp. 75–83.
David Forel et al., "A Three–Dimensional Perspective on Two–Dimensional Dip Moveout", Geophysics, vol. 53, No. 5, May 1988, pp. 604–610.
Philip S. Schultz et al., "Depth Migration Before Stack", Geophysics, vol. 45, No. 3, Mar. 1980, pp. 376–393.
J. W. Sattlegger et al., "Common Offset Plane Migration (COPMIG)", Geophysical Prospecting, 1980, pp. 859–871.
S. M. Deregowski, "Common–Offset Migrations and Velocity Analysis", First Break, vol. 8, No. 6, Jun. 1990, pp. 225–234.
J. P. Diet et al., "Velocity Analysis with Prestack Time Migration Using the S–G Method: A Unified Approach", Seismic Modeling/Migration 5: Migration Velocities/3–D Migration, Sep. 29th, pp. 957–960.
Ozdogan Yilmaz, "Seismic Data Processing", Society of Exploration Geophysicists, pp. 331–335 and 507–518.

*Primary Examiner*—Ian J. Lobo

[57] ABSTRACT

A method of prestack time migration based on the principles of prestack Kirchhoff time migration that can be applied to both 2-D and 3-D data. Common scatter point (CSP) gathers are created as an intermediate step for each output migrated trace. Normal moveout (NMO) and stacking of CSP gathers is performed to complete the prestack migration process. The method of the present invention allows the CSP gathers to be formed at any arbitrary location for velocity analysis, or to prestack migrate a 2-D line from a 3-D volume. The CSP gather is similar to a CMP gather as both contain offset traces, and both represent a vertical array of scatter points or reflectors. The CSP gather is formed from all the input traces within the migration aperture. Samples in the input traces are assigned an equivalent offset for each CSP location, then copied into the appropriate offset bin of the CSP gather in an efficient manner. The input time samples remains at the same time when copied to the CSP gather. Data in the CSP gathers may be scaled, filtered, or have noise attenuation processes applied. The equivalent offset may be derived in a simplified form as a combination NMO and post-stack migration or in a more complex form based on the double square root (DSR) equation of prestack migration. The prestack migration form of the CSP gather enables it to correctly image scattered and dipping events prior to NMO. The prestack nature, high fold, and large offsets aid in providing a better focus of the semblance plot for an improved velocity analysis.

17 Claims, 18 Drawing Sheets

PRESTACK SEISMIC MIGRATION

FIELD OF THE INVENTION

This invention relates to the field of obtaining scatter point gather information for accurately determining properties of an interior portion of a body. More particularly, this invention relates to prestack seismic migration by equivalent offset and common scatter point gather.

BACKGROUND OF THE INVENTION

Migration is a process that attempts to reconstruct an image of an original reflecting structure from energy recorded an the surface in seismic traces.

Prior art migration processing techniques expend a great deal of effort to produce a snacked section from common mid-point (CMP) gathers, followed by a post-stack migration based on the stacking velocities. Stacking velocities however, require higher velocities for dipping events than those required for post stack migration, and some form of migration velocity estimation is required. Further advances in the prior art recognized that smearing from dip compensated velocities could be corrected by the inclusion of dip moveout (DMO) and prestack migration. The use of these prestack processes in velocity analysis loops enabled a more accurate estimate of the subsurface velocities and improved subsurface images.

DMO and post stack migration is currently more economical than conventional prestack migration, consequently he DMO method tends to be the current processing standard. However, the use of DMO is generally restricted to areas with smoothly varying velocities. In areas where the smooth velocity criteria fails, prestack migration is currently the preferred processing method. Typical prestack migration methods include migration of source (or shot) records (shown in Schultz, P. and Sherwood, 1980, *Depth migration before sack*, Geophysics, Vol. 45, pp. 376–393); migration of constant (or limited) offset sections (shown in Sattlegger, J. W., et al., 1980, *Common offset plane migration* (COPMIG), Geophys. Prosp., Vol. 28, pp. 859–871, Deregowski, S. M., 1990, *Common-offset migrations and velocity analysis*, First Break, Vol. 8, pp. 225–234); and migration by alternating downward continuation between shot and geophone (S-G) gathers (shown in Diet, J. P. et al., 1993, *Velocity analysis with prestack time migration using the S-G method: A unified approach*, Technical Program, Soc. Expl. Geophys. 63rd Ann. Int. Mtg., Washington, D.C., pp. 957–960).

Kirchhoff's method is a common prestack migration procedure that can be used in many of the above recited migration algorithms. Full prestack Kirchhoff migration is a stand-alone process described by summation of input samples directly to the output migrated sample (described in Yilmaz, O. 1987, Seismic data processing, SEG, pp. 331–334). The common use of full prestack migrations is limited by computer hardware long on run times.

SUMMARY OF THE INVENTION

An object of the present invention is to provide a time domain method of prestack migration that is faster, simpler, and more flexible than conventional prior art methods.

In accordance with one aspect of the present invention there is provided a method of obtaining a common scatter point gather for determining properties of an interior portion of a body having a plurality of scatter points, comprising the steps of: (a) retrieving a plurality of input traces where each input trace is a sequential record of energy originating from a source and reflecting from the scatter points to a receiver, each one of said input traces having a plurality of data samples representing energy amplitudes; (b) defining a common scatter point location at a point within an area of interest, said common scatter point location represents a subset of the scatter points proximate to the common scatter point location; (c) defining a common scatter point gather for said common scatter point location based on geometry of the source and the receiver for the input traces relative to the scatter point location; (d) calculating a plurality of equivalent offset locations for said common scatter point gather based on: (i) geometry of the source and the receiver for each one of the input traces relative to said common scatter point location, (ii) position of the data samples in each input trace, and (iii) phsyical characteristics of the body, each one of said equivalent offset locations defining a distance between said common scatter point location and a location o a generally collocated model source and model receiver where travel time from said source to a selected one of said scatter points to said receiver is approximately equal to the travel Time from The model source to said selected scatter point to the model receiver; and (e) mapping each one of The data samples of the input traces to the equivalent offset locations in said common scatter point gather for said common scatter point location, wherein said common scatter point gather defines properties of the interior of the body.

BRIEF DESCRIPTION OF THE DRAWINGS

Embodiments of the invention will be described by way of example, in conjunction with the drawings in which.

Figure 6A:
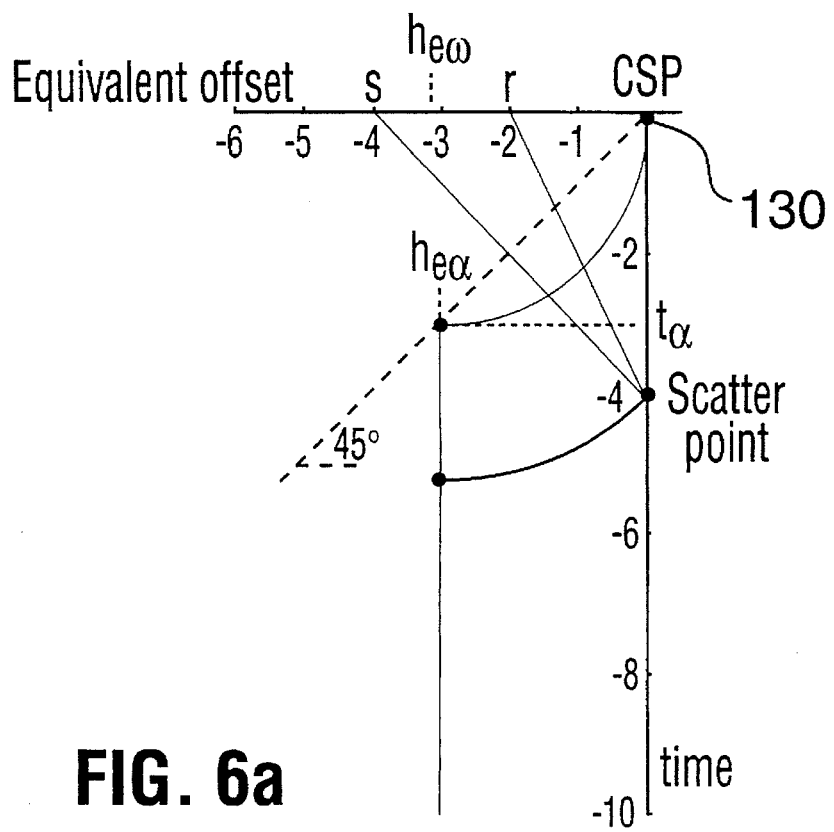
Figure 6B:
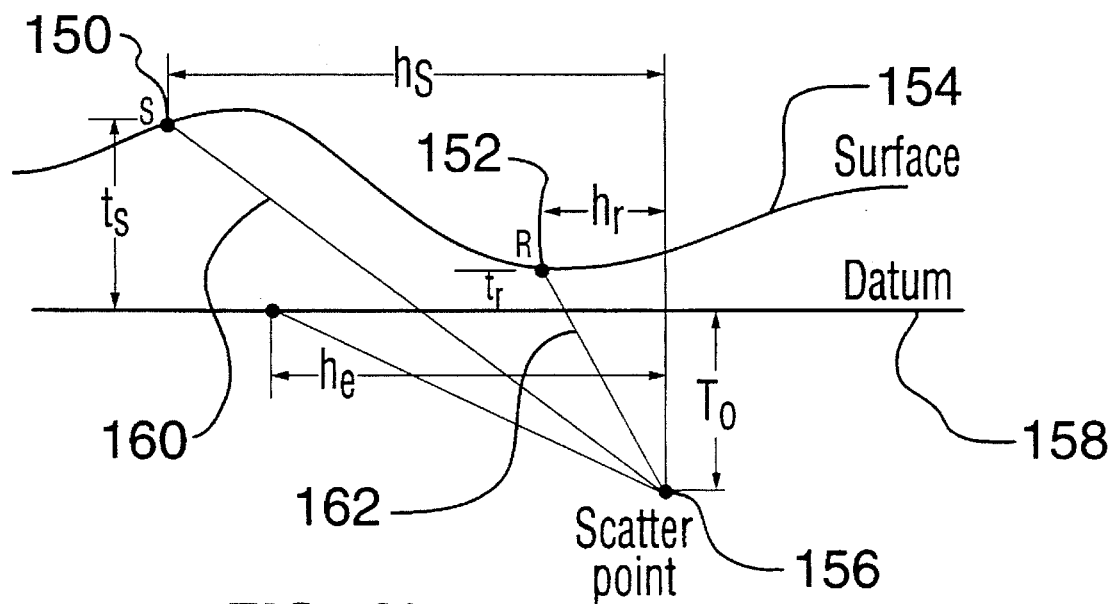

Fig, 5 is a schematic representation of a prestack migration containing an equivalent offset position for a collocated source and receiver;

FIG. 6A is a schematic representation of a time varying equivalent offset position;

FIG. 6B is a schematic representation of a rugged topography geometry for computing equivalent offsets;

FIGS. 7a–7f illustrate images of a synthetic model analyzed according to the method of the present invention;

FIGS. 8a–8d illustrate images of a real land based sample analyzed according to the method of the present invention; and FIGS. 9a–9d illustrate images of a real marine based sample analyzed according to the method of the present invention.

DETAILED DESCRIPTION OF THE EMBODIMENTS OF THE INVENTION

The Kirchhoff approach to prestack migration is based on a model of scatter points that will scatter (or reelect) energy from any source to any receiver. A reflecting event is defined at an organized arrangement of scatter points that produce a diffuse reflection. The surface position of a vertical array (or trace) of scatter points is referred to as a common scatter point (CSP) location. The objective of prestack migration is to gather all the scattered energy and relocate it at the position of the scatter points. The time of scattered energy in each input trace (relative to a scatter point) is identified by the travel time along the raypath between the source, scatter point, and receiver.

Figure 1:
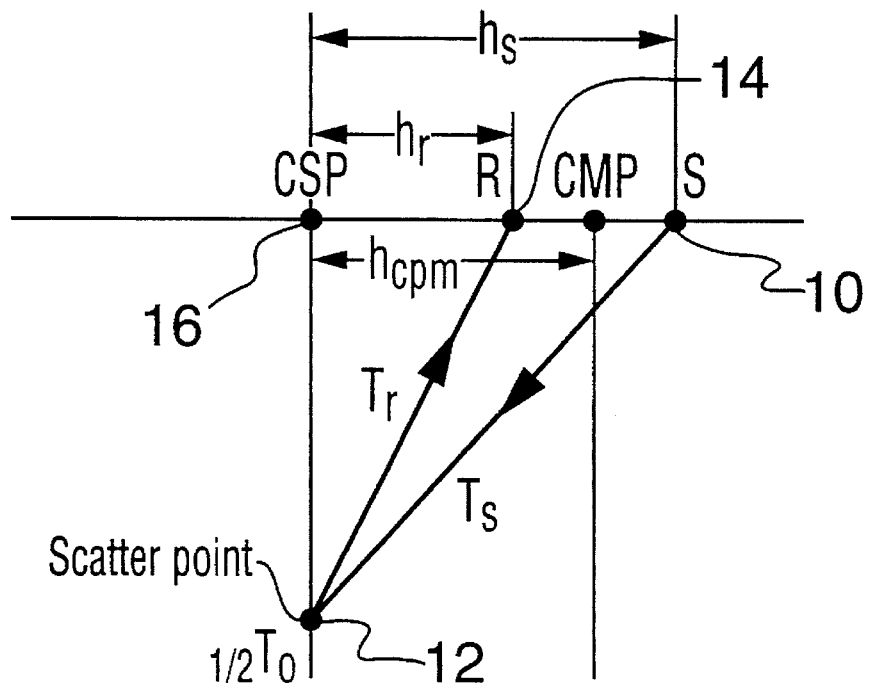
FIG. 1 is a schematic representation of the geometry used for prestack Kirchhoff time migration.

FIG. 1 shows a simplified schematic of prestack Kirchhoff time migration geometry. The travel time computation is simplified to assume linear ray paths from a source 10 to a scatter point 12, and from the scatter point 2 to a receiver 14. Travel times are computed using the geometry and a velocity that is defined for each scatter point. The migration velocity is generally equated to a root-mean-square (RMS) velocity. Results of the calculation are referred to as a time migration. After time migration the samples in a trace follow the time and path of an image ray. Image rays enable a conversion of the time migration to an estimate of the depth migration. Consequently, time migrations can be used to aid in defining the structure and velocity fields used in depth migration.

The total travel time T is estimated from a source to scatter point time $T_s$, and the scatter point to a receiver time $T_r$ by:

$$T = T_s + T_r \qquad (1)$$

$T_0$ is defined as the two-way zero offset time, to represent the zero offset travel time from a position immediately above the scatter point 12. However, for prestack computations, it is preferable to use one half the value of $T_0$ ($\frac{1}{2}T_0$) to simplify prestack equations.

Source and receiver distances $h_s$ and $h_r$, respectively, are measured from a common scatter point (CSP) location 16, and the migration velocity $V_{rms}(T_0)$ is defined at $\frac{1}{2}T_0$ and is independent of $h_s$ and $h_r$. Equation (1) then becomes a double square root (DSR) equation:

$$T = \sqrt{1/2 T_0^2 + \frac{h_s^2}{V_{rms}^2(T_0)}} + \sqrt{1/2 T_0^2 + \frac{h_r^2}{V_{rms}^2(T_0)}} \qquad (2)$$

Kirchhoff's migration algorithm generally processes one scatter point at a time, and searches all the input traces for energy that has been scattered. The travel time T is computed for each input trace within a migration aperture. The energy at those times is filtered, scaled, and then summed into a migrated sample. The energy gathered into the migrated sample will constructively (or destructively) sum to recreate the structure of the subsurface.

The filtering of the input traces is usually necessary to prevent aliasing noise in the reconstructed image. Antialias filtering will vary for the same sample of a given input trace depending on the relative location of the scatter point. The amplitude weighting of the input samples also varies with each input trace depending on the relative location of the scatter point.

Figure 2:
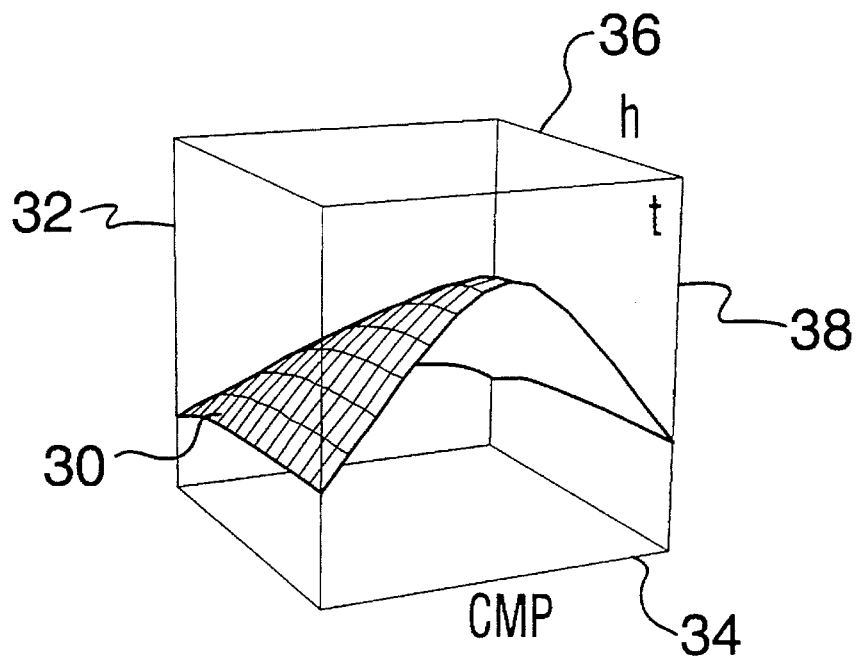
FIG. 2 is a perspective view of Cheop's pyramid, he impulse response of a point scatterer in a prestack volume.

FIG. 2 illustrates a perspective view of a Cheop's pyramid (an impulse response of a point scatterer in a prestack volume) in which the two-way travel time T is computed from one scatter point to a continuum of 2-D source and receiver locations. The pyramid is displayed as a surface 30 in a three dimensional volume 32 defined by a common mid-point (CMP) axis 34, a source/receiver half offset (h) axis 36, and a time (t) axis 38. The Cheop's pyramid has two hyperbolic planes, one at zero offset location (i.e. in the CMP-t plane), and the other at the scatter point location with variable offset. The hot plane on the side 32 of FIG. 2 illustrates a CMP gather with energy coming from a scatter point out of the plane of the CMP gather. This energy is distributed with non-hyperbolic moveout 30 and cannot be accurately focused by NMO and stacking.

For real data, examples provided hereinbelow, the location of energy on the pyramid surface 30 will be determined from the reflection strength of the neighboring scatter points. Horizontal linear reflections will end to concentrate energy at the top portion of the pyramid, while dipping reflectors will tend to have more energy at the corresponding seismic dip. Energy from edges, such as faults, will be dispersed more evenly over he entire surface. The velocity for data on the pyramid is defined at the apex, or scatter point location, even though it may extend into areas with complex velocity structures. The pyramid 30 shown in FIG. 2 was defined for 2-D data where the top surface of the volume is equivalent to a stacking chart. Energy from a scatter point in 3-D data may also be mapped into a Cheop's pyramid by substituting other parameters known in the art for the CMP location and half source/receiver offset.

The method of the present invention collapses the energy of the Cheop's pyramid surface 30 to a scatter point 12 to emulate full prestack Kirchhoff time migration (discussed above) where time T is computed from the DSR equation (2).

The method of the present invention generates prestack migration gathers, termed common scatter point (CSP) gathers, that are based on the scatter point principles shown in FIG. 1. The formation of CSP gathers can be created at any arbitrary location within a 3-D volume for velocity analysis, or may be used to quickly extract an arbitrarily located prestack migrated 2-D line from the 3-D volume.

CSP gathers are formed when samples in the input traces are assigned an offset that is based on the distance between the source/receiver positions relative to each CSP location. This offset is referred to as the equivalent offset. Once this offset is assigned, the input trace is then summed directly into the offset bins of the CSP gather. No time shifting of the input data is required, however, time shifting can still be accommodated if required.

EQUIVALENT OFFSET DEFINITIONS

In conventional normal moveout (NMO) and post-stack migration, energy from each input trace is spread to all output traces similar to prestack migration. Energy is first moved from the original two way time position T, by NMO, to the zero offset two way time $T_{0-nmo}$:

$$T^2 = T_{0-nmo}^2 + \frac{4h^2}{V_{rms}^2} \qquad (3)$$

, where h is half the source/receiver offset.

Energy may then be moved from the zero offset at two-way time $T_{0-nmo}$ to the migrated two-way time $T_{0-mig}$ by the kinematic Kirchhoff migration equation:

$$T_{0-mno}^2 = T_{0-mig}^2 + \frac{4x_{off}^2}{V_{rms}^2} \qquad (4)$$

where $X_{off}$ is the offset between the CMP and migrated position.

These two equations (3 and 4) can be combined to move energy directly from the input trace to the migrated position by substituting (4) into (3) to give:

$$T^2 = T_{0-mig}^2 + \frac{4(h^2 + x^2)}{V_{rms}^2} = T_{0-mig}^2 + \frac{4h_c^2}{V_{rms}^2} \qquad (5)$$

assigning an initial estimate of the equivalent offset term ($\tilde{h}_e$) as:

$$\tilde{h}_e = h^2 + x_{off}^2 \qquad (6)$$

Figure 3:
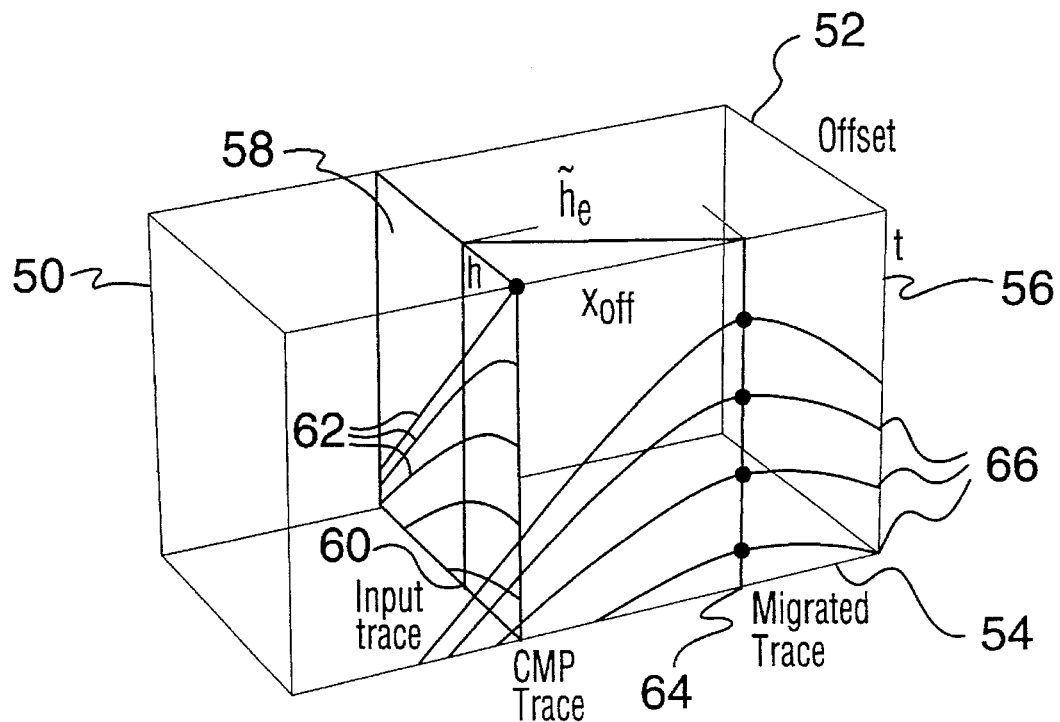
FIG. 3 is a perspective schematic view of a prestack volume for 2-D data.

FIG. 3 schematically illustrates a process that combines normal moveout (NMO) and post-stack migration into one NMO step with a new offset defined in equation (6). This process is essentially prestack migration utilizing Kirchhoff migration principles, requiring the use of scaling, antialiasing filters, and phase compensation filters.

A prestack volume 50 is defined by a half source/receiver offset axis 52, a common mid-point (CMP) trace position axis 54, and a time t axis 56. Although FIG. 3 relates to 2-D data with one axis defining the CMP location, similar concepts apply for 3-D data. A shaded plain region 58 represents a CMP gather and includes one example of an input trace 60 at a CMP location with offset h. Hyperbolic curves 62 on the CMP gather represent the time shifting paths taken by data during NMO and stacking. The front surface of the volume 50 represents a stacked or zero offset section. The zero offset section contains an arbitrarily located migrated trace 64 with a plurality of hyperbolas 66, and also shows the time shifting paths for migration.

Figure 4:
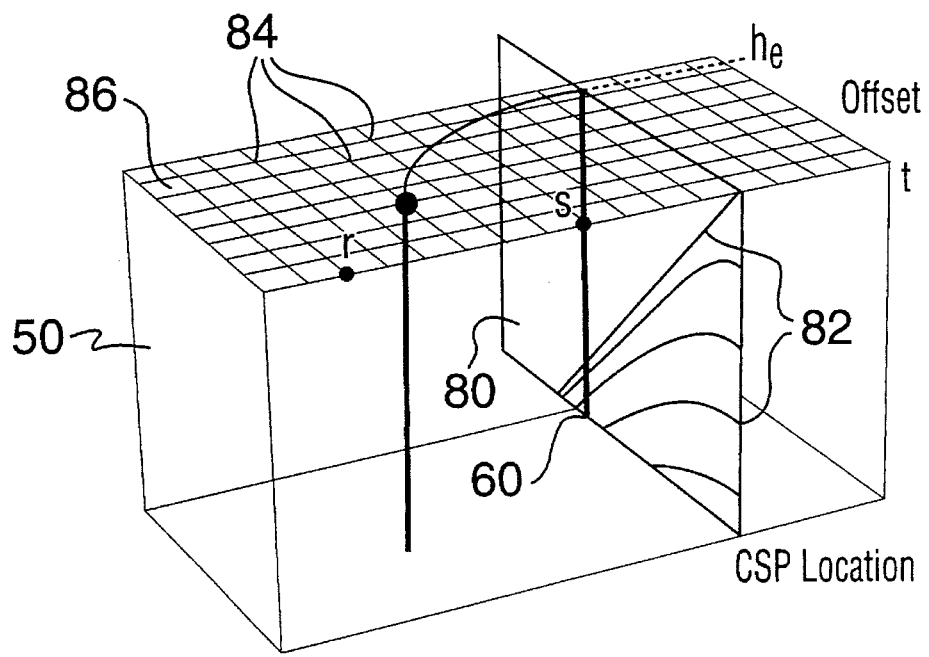
FIG. 4 is a perspective schematic view of a prestack volume for 2-D data illustrating the movement of energy from an input trace to a prestack migration gather according to the present invention.

The equivalent offset $h_e$ allows all the input traces to be gathered prior to NMO for a given migrated position as shown in FIG. 4. FIG. 4 shows the same input trace 60 copied into a bin of CSP gather 80 (shaded region) at the offset defined by $h_e$. NMO curves 82 required for prestack migration to the output location (i.e. the CSP location) are also shown in the shaded migration gather 80.

Intersection points 84 of a grid 86 on the top surface of volume 50 are used to identify the position of other input traces positioned by CMP and offset h. All these traces may be assigned an equivalent offset and copied onto the prestack migration gather. These equivalent offsets may be much larger than the maximum source receiver offset that is illustrated by extending the shaded area 80 of the gather beyond the maximum source receiver offset. When the migration position is moved, the input traces will be assigned different equivalent offsets, The definition of equivalent offset provided above may be further improved by incorporating the DSR equation (2). This is accomplished by defining a new source and receiver that are collocated at an equivalent offset position.

Figure 5:
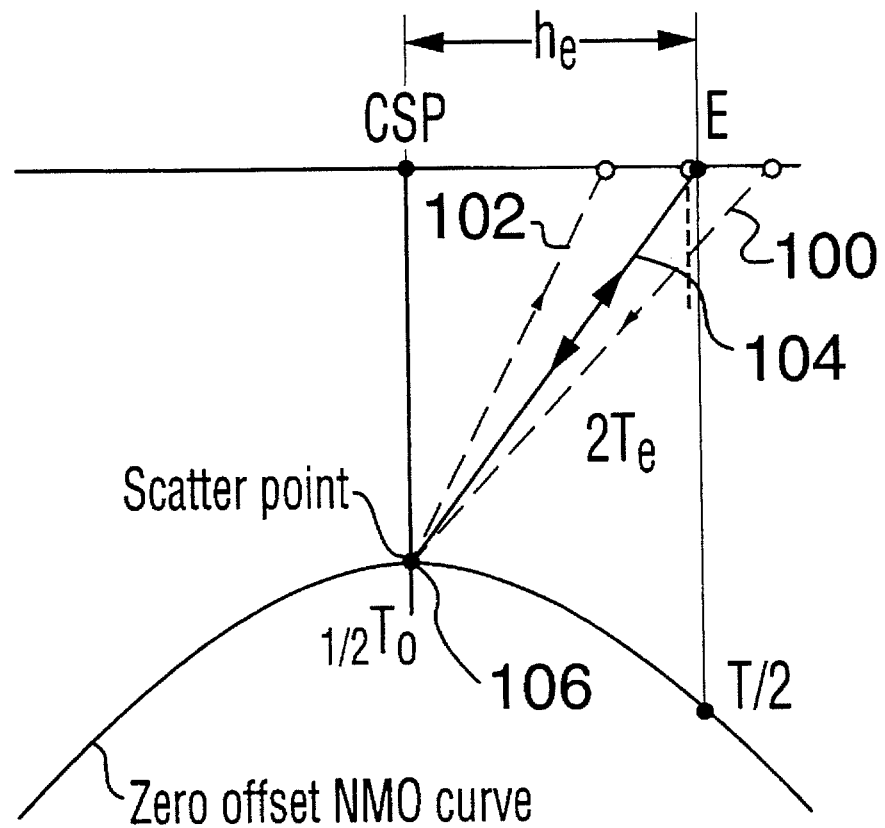

FIG. 5 illustrates prestack migration containing an equivalent offset position at E for a collocated source and receiver. The equivalent offset is chosen to maintain the same total travel times as the original paths 100 and 102 (dotted lines) by a single two way path 104 (solid line) defined as $2T_e$. In forcing the source and receiver to be collocated, and positioned at the equivalent offset E, he reflection time is now located on an hyperbola (the zero offset NMO curve) centered at the scatter point as shown in FIG. 5.

The NMO and stacking of the energy on the hyperbola complete the prestack migration. Equation (1) is modified to include the equivalent offset one-way time $T_e$ to become:

$$2T_e = +T_s T_r = T \qquad (7)$$

Substituting the raypath parameters and using one-way times gives:

$$2\left(1/2T_0^2 + \frac{h_e^2}{V_{rms}^2}\right)^{1/2} = \left(1/2T_0^2 + \frac{h_s^2}{V_{rms}^2}\right)^{1/2} + \left(1/2T_0^2 + \frac{h_r^2}{V_{rms}^2}\right)^{1/2} \qquad (8)$$

The RMS velocities are all defined at the scatter point 106. Solving for $h_e$ we obtain:

$$h_e^2 = 0.25[(1/2T_0^2 V_{rms}^2 + h_s^2)^{1/2} + (1/2T_0^2 V_{rms}^2 + h_r^2)^{1/2}]^2 - 1/2T_0^2 V_{rms}^2 \qquad (9)$$

When the source and receiver are both on the same side of the CSP location (2-D data) as in FIG. 1, then the half source/receiver offset h and the CMP to CSP distance $x_{off}$, are defined by:

$$h = \frac{||h_s| - |h_r||}{2} \text{ and } x_{off} = \frac{|h_s| + |h_r|}{2} \qquad (10) \text{ and } (11)$$

or $$h_s = x_{off} \pm h \text{ and } h_r = x_{off} \pm h \qquad (12) \text{ and } (13)$$

Input 2-D traces in which the source and receiver straddle the CSP, and all input 3-D traces, may be converted into a geometry similar to FIG. 1 by rotating the raypaths to be in a common vertical plane on the same side of the CSP location. Equations (10) and (11) are used as a general definition of h and are used instead of $x_{off}$, and the actual 3-D surface geometry. The relative position of the source and receiver may alter the signs in equations (11) and (13), but will have no effect on the following computation for the equivalent offset. Azimuthal information of the source and receiver rays should still be preserved and used for azimuthal stacking.

Substituting equations (12) and (13) into equation (8) yields a more useful full definition of the equivalent offset:

$$h_e^2 = x_{off}^2 + h^2 - \left(\frac{2x_{off}h}{TV_{rms}}\right)^2 \qquad (14)$$

The equivalent offset $h_e$ defined in equation (14) is time or depth varying, and also a function of velocity. As a consequence, an input trace may have its samples spread over a number of offset bins. An example of the time varying equivalent offset is shown in FIG. 6A, where the source s and receiver r positions are located relative to CSP location 130. The first useful energy in the input traces comes at a time $t_\alpha$ defined as the reflection from a scatter point at the surface of the CSP location 130 and is given by:

$$T_\alpha = \frac{2h_{cmp}}{V_{rms}} \qquad (15)$$

with an offset of this first point $h_{e\alpha}$ is defined by:

$$h_{e\alpha} = x_{off} \qquad (16)$$

Energy at this point will migrate to the surface of the CSP migrated output trace with a dip of 90 degrees. The energy contribution to the CSP remains below $T_\alpha$, where the offset increases slightly and tends to an offset asymptote $h_{e\omega}$ given by:

$$h_{e\omega}^2 = x_{off}^2 + h^2 \qquad (17)$$

which is also the same offset given by equation (6), derived from NMO and post-stack migration.

Although it appears from equation (14) that the equivalent offset $h_e$ needs to be computed for each input sample, this is not the case since it is only actually necessary when the input samples start in a new bin. The first useful sample on an input trace will come from a reelection off the scatter point at the surface. The travel time to this scatter point is $T_\alpha$, and these times lie at a 45 degree angle on the CSP gather as illustrated in FIGS. 4 and 6.

An initial equivalent offset $h_{e\alpha}$ may be computed from this time and assigned to an appropriate offset bin with central offset $h_e(n)$ and incremental offset $\delta h_e$. The following samples are added to this bin until the equivalent offset increases to $h_e(n)+\frac{1}{2}\delta h_e$, at which point the samples are then added to the next offset bin $h_e(n+1)$. The time at which this occurs is $T(m+1)$ and may be found by rearranging equation (14) to give:

$$T(m+1) = \frac{(2x_{off}h)}{V_{rms}(T_0) \, [x_{off}^2 + h^2 - h_e^2(n+1)]^{1/2}} \quad (18)$$

In a similar manner, the transition times for all the offset bins may be computed, to allow efficient copying of the input trace samples into the respective bins. The above assumption of using $T_\alpha$ as the starting time for an input trace assumes that the energy will propagate to time zero and correspond to a 90 degree migration. Time migrations to this steep angle may be impractical and include a great deal of unwanted noise. Limiting the extent of the migration angle is a popular feature of Kirchhoff migrations and it may also be applied to the formation of the CSP gathers of the present invention.

The pre-migration dip angles on the CSP gather may also be limited to reduce the noise, with an additional benefit of reducing the number of offset bins used by an input trace. In many cases, all samples in an input trace will map into one offset bin at offset $h_{e\delta}$. This benefit also occurs when half offset h is small relative to $x_{off}$, or when the first useful scatter points are below the surface as in marine data.

FIG. 4 also illustrates the migration aperture or the amount of useful information contributed by each input trace relative to its equivalent offset. The NMO curves 82 on he shaded area 80 may be used to project the input data to the final position at zero offset. For this CSP location, only a small portion to the bottom of the input trace will contribute energy to the top half of the migrated trace. The 45 degree diagonal line shows the time $T_\alpha$ of the first useful input energy of the input traces. This line can be observed going to the maximum time and thus define the maximum offset for the migration aperture. Traces with offset beyond this range should not be considered for the respective CSP gather. In some applications, the maximum useful offset of the migration aperture may be further reduced when the offset apply to data below the zone of interest.

The illustration in FIG. 4 uses a source/receiver offset that is relatively large when compared to the trace length, and may imply that the equivalent offset only contributes a few additional offsets with limited energy contribution. For real data, useful equivalent offsets are often three times the maximum source/receiver half offset.

Scaling and filtering operations can be applied efficiently before NMO and summation with little extra overhead. Application of a 3-D differential filter (root differential filter for 2-D) before NMO and summation aids in focusing the velocity energy on semblance plots to improve the accuracy of velocity analysis. In addition, other parameters such as dip range may also be applied to the CSP gathers and tested to optimize their effect on the final migration. The size of the bin spacing $\delta h$ in a CSP gather may be determined from the maximum allowable time shift which results from applying NMO to neighboring bins. This value will depend on the frequency content of the data and the acquisition geometry.

The effect of finite bin size with the high fold, and an assumed linear distribution, is to box car filter the binned data with period equal to the time shift. This filter has the same parameters as one required for antialiasing and in effect provides a natural filter for the data in a CSP gather.

In practice, the bin spacing in the CSP. gathers is less than that of the 3-D subsurface grid (or CMP spacing for 2-D) that require a more severe antialiasing filter criteria. The bin size has little effect on the time required for acquiring the CSP gathers as the same number of input samples are summed. Smaller bin sizes require more offset bins, so the memory requirements to save the offset will however increase. The offset bin size should not confused with the offset bin sizes in constant offset migration where the number of offset bins tend to be small to expedite the algorithm.

After the gathering, scaling, and filtering of the CSP gathers, the remaining processing steps to complete the prestack migration are NMO and stacking. Regular processing software may be used, along with conventional velocity analysis techniques. The only new software required is a routine to define the equivalent offset, and a routine to add the input energy to the appropriate offset bin.

A comparison between the fold of the CMP gather and the prestack migration gather may be visualized from FIG. 4. A CMP gather contains 9 traces from the grid, while the CSP gather could contain 225 traces. In real 2-D data, the CMP gather may contain only 15 live traces for a maximum possibility of 60 bins, while the corresponding CSP gather may contain tens of thousands of input traces spread over a few hundred bins. A CSP gather from 3-D data may contain hundreds of thousands of input traces. This extremely high fold and large offsets enable accurate velocity analysis at each migrated position. In contrast several CMP gathers may be required to obtain a single fold coverage for conventional velocity analysis.

An important property of the CSP gather is that many traces are summed using only the asymptotic equivalent offset $h_{e\delta}$. This data is independent of both time and velocity, providing stability to the CSP gather when the velocities are unknown. The CSP gathers may be formed with an arbitrary velocity, and the gather used o define a more accurate velocity. The iterations of this process converge very rapidly, and usually only one or two iterations are required. Velocities derived from the CSP gather are RMS type velocities, and can be converted to velocities and depths that will tie reasonably with sonic logs.

The increased offset range of the CSP gather, and its high fold improve the resolution of velocity analysis. Consequently, the velocities on semblance plots focus to smaller points than on conventional semblance plots formed from a CMP gather. The better focusing of the data on semblance plots illustrates the improved resolving power of prestack migration, and illustrates that velocities must be quite accurate to enhance the signal and reduce the energy of multiples. This feature of the CSP gather may have substantial implications for acquisition designs that are based on CMP gathers. In addition to the benefits of prestack migration, the standard algorithms for noise or multiple removal, designed for use with CMP gathers, may also be applied directly to CSP gathers.

The above discussion of the present invention has used prestack migration to define CSP gathers based on equivalent offsets. However, other criteria for forming the gathers are available. For example, azimuth restrictions may be applied to 2-D or 3-D data. Additional applications allow the inclusion of converted wave velocity analysis for prestack migration, crooked line processing and prestack migration in areas of rugged topography.

Equation (2) gives the kinematic or timing solution for Kirchhoff prestack time migration. In conventional prestack time migrations this equation is evaluated many times since each input sample contributes energy to many migrated samples. The number of times the DSR equation must be evaluated depends on the number of traces in the x direction $n_x$, the number of traces in the y direction $n_y$, the average fold $n_f$, and the number of samples in a trace $n_s$. The total number of input samples is approximately $n_x \times n_y \times n_f \times n_s$, and many of these samples must be copied to every migrated trace $n_x \times n_y$. Input traces that are more distant from a CSP location contribute less energy to form a cone shape of input data. This cone shape reduces the number of DSR's by two thirds. For a small 3-D, the total number of DSR computations $N_{DSR}$ may be approximated from:

$$N_{DSR} \approx n_x^2 \times n_y^2 \times n_f \times n_s \div 3 \quad (19)$$

For a small 3-D project with traces $n_x$=115 and $n_y$=120, an average fold $n_f$=20, and $n_s$=1000 samples, the total number of DSR computations is approximately $1.27 \times 10^{12}$. This number must also be increased to get the actual number of floating point operations. These computation are only for the kinematic or time considerations. Consideration for scaling and filtering of each input sample relative to each output scatter point to prevent aliasing can also be included according to principles known in the art. Even with megaflop processors, these numbers become quite formidable. For large 3-D's, the number of input traces contributing energy to a CSP location becomes limited by the migration aperture and significantly reduce the size of $N_{DSR}$ that is estimated from equation (3).

An earlier section specified equation (3) for estimating the number of DSR computations for full prestack Kirchhoff time migration in a small 3-D. A numerical comparison with the equivalent offset and CSP gather may now be made. Defining the number of offset bins for each CSP gather to be $n_{bin}$, the number of NMO computations $N_{nmo}$ may be estimated from:

$$N_{nmo} \approx n_x \times n_y \times n_{bin} \times n_s \div 2 \quad (20)$$

, where the division by two compensates for the cone input data projected onto a 2-D plane.

The speed of evaluating the DSR and NMO equations may be significantly increased by using look up tables, and it is difficult to estimate the actual number of floating point computations. As a result a comparison will only be made between the number of DSR computations $N_{dsr}$ with the number of NMO computations $N_{nmo}$, and is found by dividing equation (20) into equation (3):

$$\frac{N_{dsr}}{N_{nmo}} = \frac{n_x \times n_y \times n_f \times 2}{n_{bin} \times 3} \quad (21)$$

Using the values defined earlier for a small 3-D project, and using a number of offset bins $n_b$=150, the above ratio of equation (21) becomes approximately 1227. The resulting computer time for the NMO computation may be less than the time required for creating the CSP gathers, and becomes a small part of the overall processing time. Consequently changes in the number of CSP offset bins has very little effect on the overall computation time for prestack migration. This overall improvement in speed ie in the order of 100's for a 3-D survey relative to full prestack Kirchhoff time migration.

Static analysis is an area in which the CSP gather may also be of significant benefit. When conventional 2-D lines are recorded with source points at four-station intervals, four independent (de coupled) surface consistent solutions are obtained. Each receiver only contributes to every fourth CMP, requiring filtering techniques to combine he solutions. In addition, the static solutions are obtained on NMO'ed data by correlating each input trace with a model trace that is typically from a smoothed brute section.

The CSP gather, in contrast to a CMP gather, contains many contributions from all sources and all receivers within the prestack migration aperture. This greatly increases the number of correlations and ensures the coupling of all sources and receivers with all CSP's. The high fold of the CSP gather may enable it to serve as a model for the input traces before NMO, to give statics that are independent of the stretching due to NMO. The success may possibly depend on removing coherent noise to create a suitable CSP gather model for correlating input traces.

Many traces in a CSP gather are positioned with offsets close to the asymptote $h_{e\delta}$ and are therefore independent of time and velocity. When CSP gathers are produced independent of time and velocity, the potential applications may exceed those of prestack time migration. Time migrations with more complex moveout equations are possible and may be a necessity for taking advantage of the long offsets. In addition the accurate velocities derived from the CSP gathers may allow an accurate estimation of average velocities to produce an approximate depth migration.

CSP gathers may be formed to bias the azimuth of a ray path from either the source to scatter point, or the scatter point to receiver. Ray paths with a desired azimuth of one ray path leg may be collected with the azimuth of the other leg left to vary randomly. Thus, a number of CSP gathers may be formed at the same CSP location, each with a different azimuth. Comparison between azimuthal gathers may allow a better estimate of anisotropic velocities, and produce a better prestack migration. The processing time of azimuthal gathers will only double the stack time required to create the azimuthal CSP gathers at a given CSP location because each input trace will only sum into two azimuthal gathers, one for each leg of the total ray path.

The step of computing the equivalent offset for rugged topography wall be discussed in conjunction with FIG. 6B.

FIG. 6B illustrates an example of rugged topography geometry. A datum correction for a source 150 is $t_s$. A datum correction for a receiver 152 is $t_r$. Accurate prestack migrations can be achieved by migrating from a surface 154, i.e. from the elevation of the source 150 and the elevation of the receiver 152. The velocity $V_{srs}$ of the source 150 is defined from the elevation of the source 150, with the velocity at a scatter point 156 defined by $V_{srs}(T_0+t_s)$ and a similar receiver velocity $V_{rec}(T_0+t_r)$. The velocity at the scatter point 156 from a datum 158 is given by $V(T_0)$. The replacement velocity is given by $V_{rep}$. The total travel time T from the source 150 to the scatter point 156 $T_s$ and from the scatter point 156 to he receiver 152 $T_r$ is:

$$T = T_s + T_r \quad (22)$$

The travel times Ts and Tr are defined by the double square root equation (DSR) modified for rugged topography:

$$T = \left( (T_0+t_s)^2 + \frac{h_s^2}{V_{srs}^2(T_0+t_s)} \right)^{1/2} + \left( (T_0+t_r)^2 + \frac{h_r^2}{V_{rec}^2(T_0+t_r)} \right)^{1/2} \quad (23)$$

These times equate the travel time of the collocated source and receiver located on the datum 158 for the common scatter point gather:

$$T = 2\left(T_0^2 + \frac{h_e^2}{V^2(T_0)}\right)^{1/2} \quad (24)$$

giving the rugged topography equivalent offset:

$$h_e^2 = V^2(T_0)\left(\frac{T^2}{4} - T_0^2\right) \quad (25)$$

The velocities $V_{srs}$ for a source ray path 160 and $V_{rec}$ for a receiver raypath 162 are based on the velocity at the scatter point 156 V, and modified using the Dix equation to account the different elevation:

$$V_{srs}^2 = \frac{T_0 V^2(T_0) + t_s V_{rep}^2}{T_0 + t_s} \quad V_{res}^2 = \frac{T_0 V^2(T_0) + t_r V_{rep}^2}{T_0 + t_r} \quad (26)$$

The process of moving input data to the common scatter point gather begins with $T_0$ equal to zero. The following three steps are performed in a loop with incremental increases in $T_0$ storing the results for T(m) and $h_e$(m) in arrays, until T(m) exceeds the maximum time on the input trace:

1. calculate $V_{srs}$ and $V_{rec}$ at $T_0$ using equations (26);
2. calculate T using equation (24); and
3. calculate the equivalent offset $h_{e3}$ from equation (25).

The data from the input trace is copied to the offset bins of he CSP gather using the arrays T(m) and $h_e$ (m).

Converted wave processing assumes the downward propagating ray path is a P wave, and the reflection converts some P wave energy into shear wave energy that propagates to the surface. Recording of this shear wave energy with 3 component receivers provides additional information about the reflecting or converting surface, and allows the estimation of properties such as Poisson's ratio. The principle of equivalent offsets may be applied to the processing of converted wave data. CSP gather processing provides better velocity analysis, simplifies he process, reduces the computation time, and gives improved results. The processing method starts with the DSR equation using the appropriate P and S velocities for each leg of the ray path going to and from the equivalent offset. The subscripts P and S are used with the velocity V to indicate the use of the appropriate velocity, giving:

$$\left(1/2T_{0-s}^2 + \frac{h_e^2}{V_{P-rms}^2(T_0)}\right)^{1/2} + \left(1/2T_{0-r}^2 + \frac{h_s^2}{V_{S-rms}^2(T_0)}\right)^{1/2} = \quad (27)$$

$$\left(1/2T_{0-s}^2 + \frac{h_s^2}{V_{P-rms}^2(T_0)}\right)^{1/2} + \left(1/2T_{0-r}^2 + \frac{h_r^2}{V_{S-rms}^2(T_0)}\right)^{1/2}.$$

The equation may be solved to find the equivalent offset $h_e$ in terms of the pseudo depth $\tilde{Z}_0$, and the Vp/Vs ratio $\gamma$
The solution:

$$h_e^2 = \frac{1}{(1+\gamma)^2}\{(\tilde{Z}_0^2 + h_s^2)^{1/2} + \gamma(\tilde{Z}_0^2 + h_r^2)^{1/2}\}^2 - \tilde{Z}_0^2 \quad (28)$$

where $$\tilde{Z}_0 = T_{0-s}V_{P-rms} = T_{0-r}V_{S-rms} \quad (29)$$

shows that the equivalent offset will enable the formation of a common conversion scatter point (CCSP) gather. Use of the equivalent offset, transforms the input converted wave data to be hyperbolic in the CCSP gathers and therefore allows conventional velocity analysis and processing. Specifically, the process of moving samples from input traces to the offset bins in the CSP gather is similar to the process described above in conjunction with FIG. 6B. More generally, the rugged topography considerations can be included in the converted wave process discussed above.

Other applications of CSP gathers according to the present invention include the formation of an unmigrated image in which data in the CSP gathers contain zero offset information required to migrate the energy to the trace at the CSP gather. With the appropriate azimuth sorting, energy in these gathers may be rotated back to the zero offset plane to form an unmigrated zero offset stacked section. In addition, in the field of surface consistent statics conventional processing usually forms a brute stack to serve as a model for the evaluation of surface consistent statics. However, use of the CSP gather can form the basis of a model that will allow statics to be evaluated prior to NMO.

EXAMPLES

Synthetic Model

FIGS. 7a-f illustrate various synthetic models illustrating a hockey stick model (a), the source record (b), the CSP gather (c), the CSP gather with NMO (d), the equivalent offset migration (e), and the close up CSP gather (f).

The model was created to evaluate the performance of the migration. The 2-D model consists of one scatter point and two linear reflectors. One linear reflector is short and horizontal, while the other dips steeply with one end meeting the horizontal reflector. The dipping reflector has a gap close to its middle. Simple source records were created from the model by estimating the travel times from each reflector and placing a wavelet centered at the travel times. No attempt was made to model amplitude variations. No diffractions were included in the model except for the impulse response from the one scatter point.

Figure 7A:
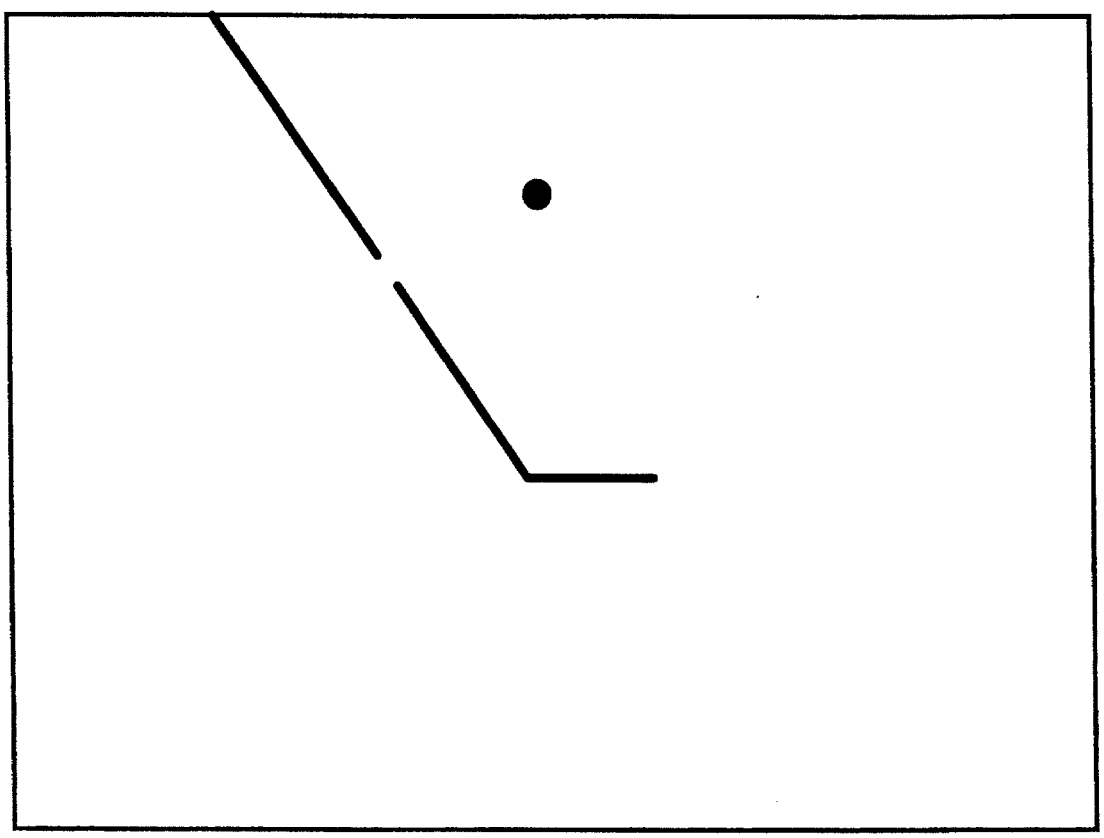
Figure 7B:
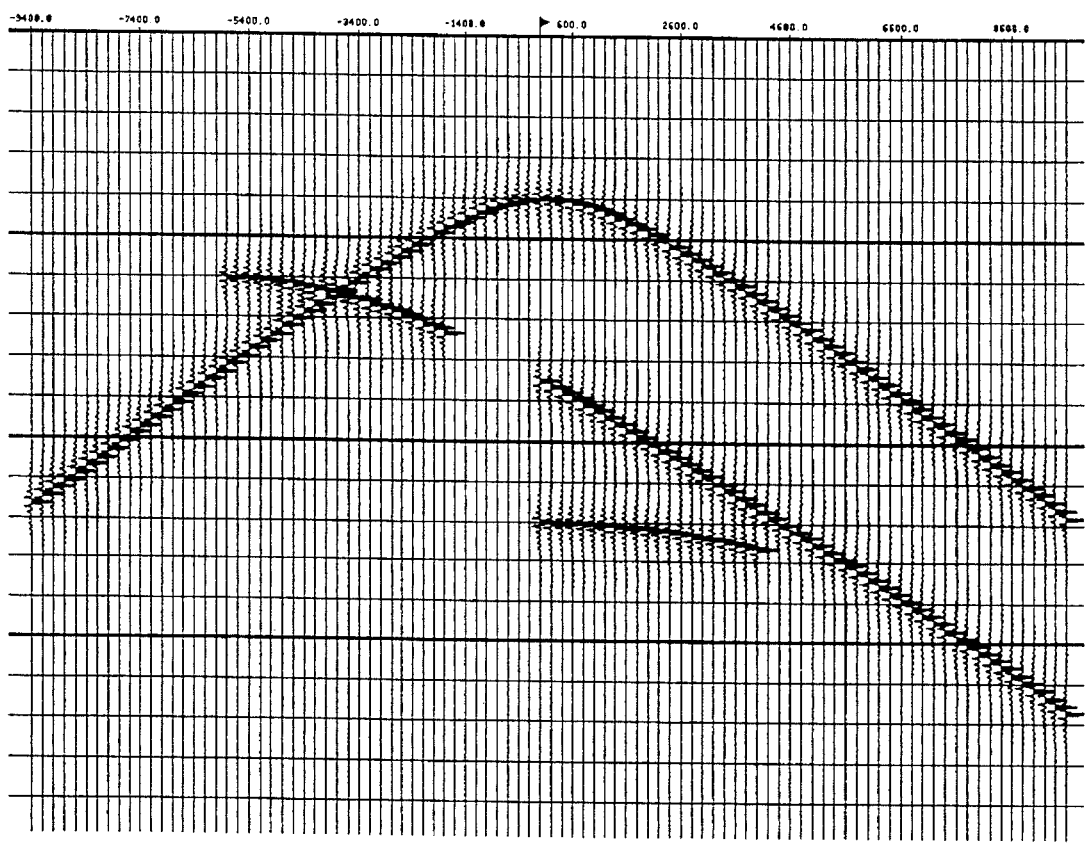
Figure 7C:
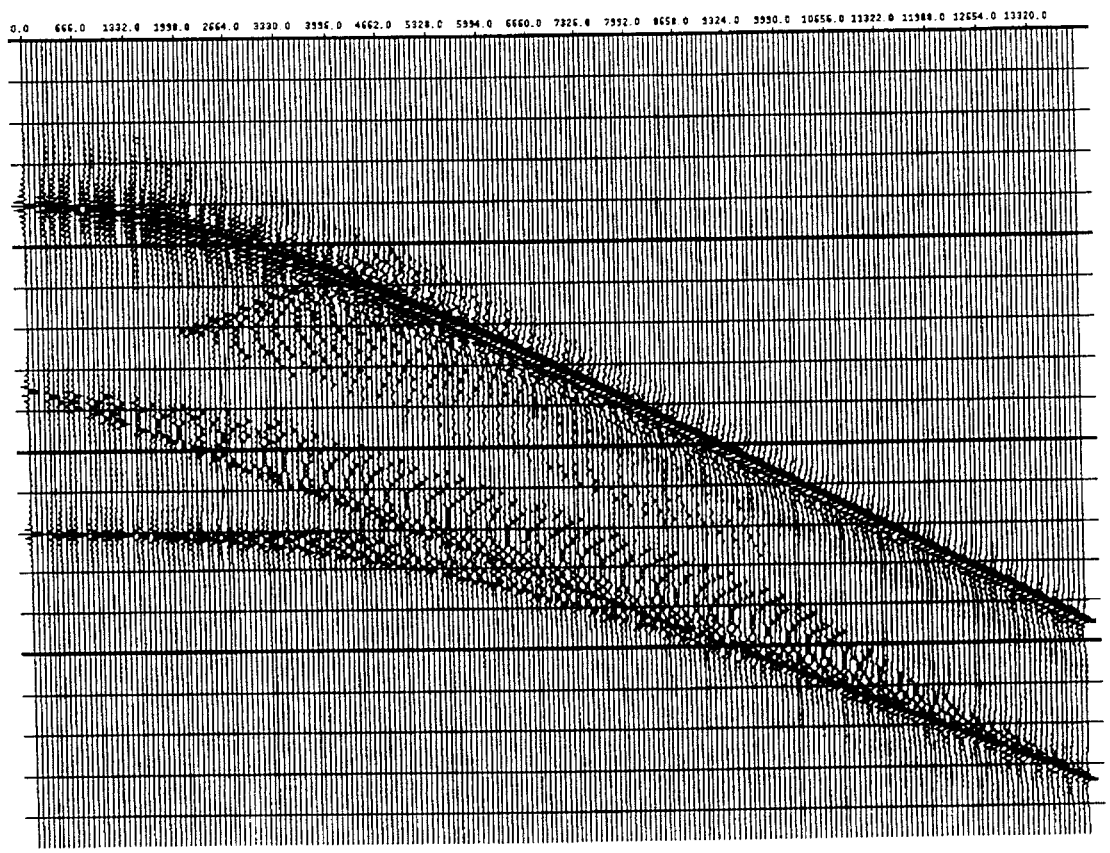
Figure 7D:
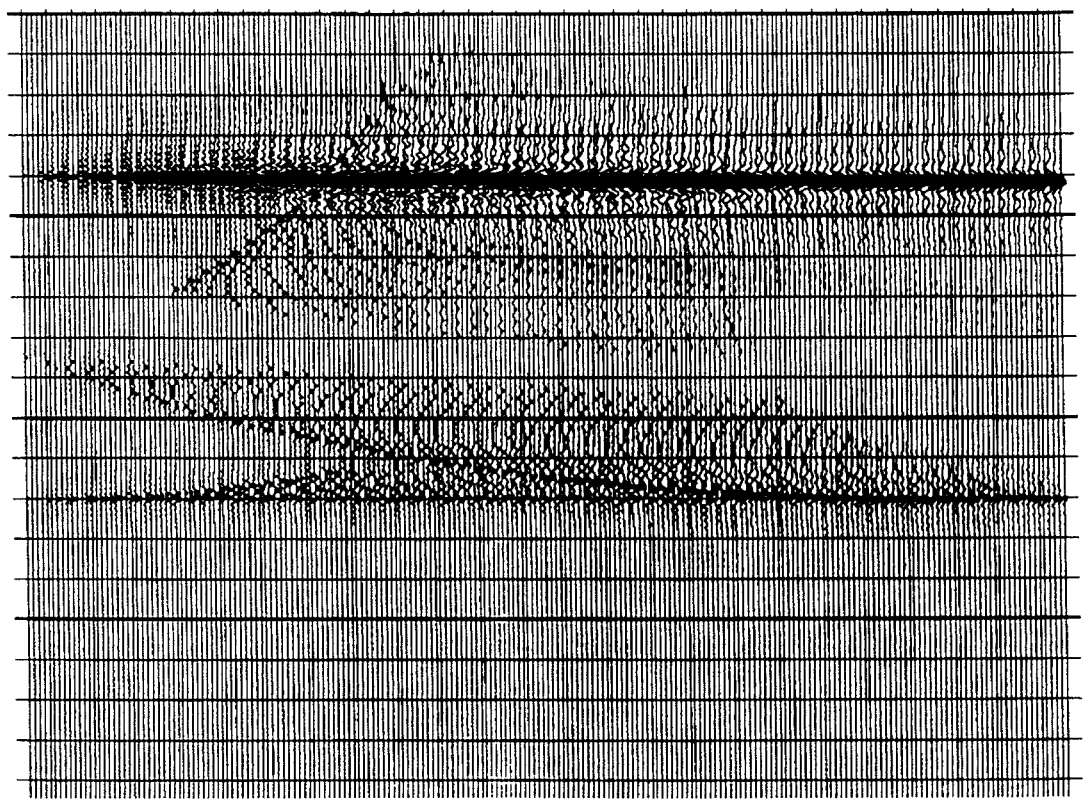
Figure 7E:
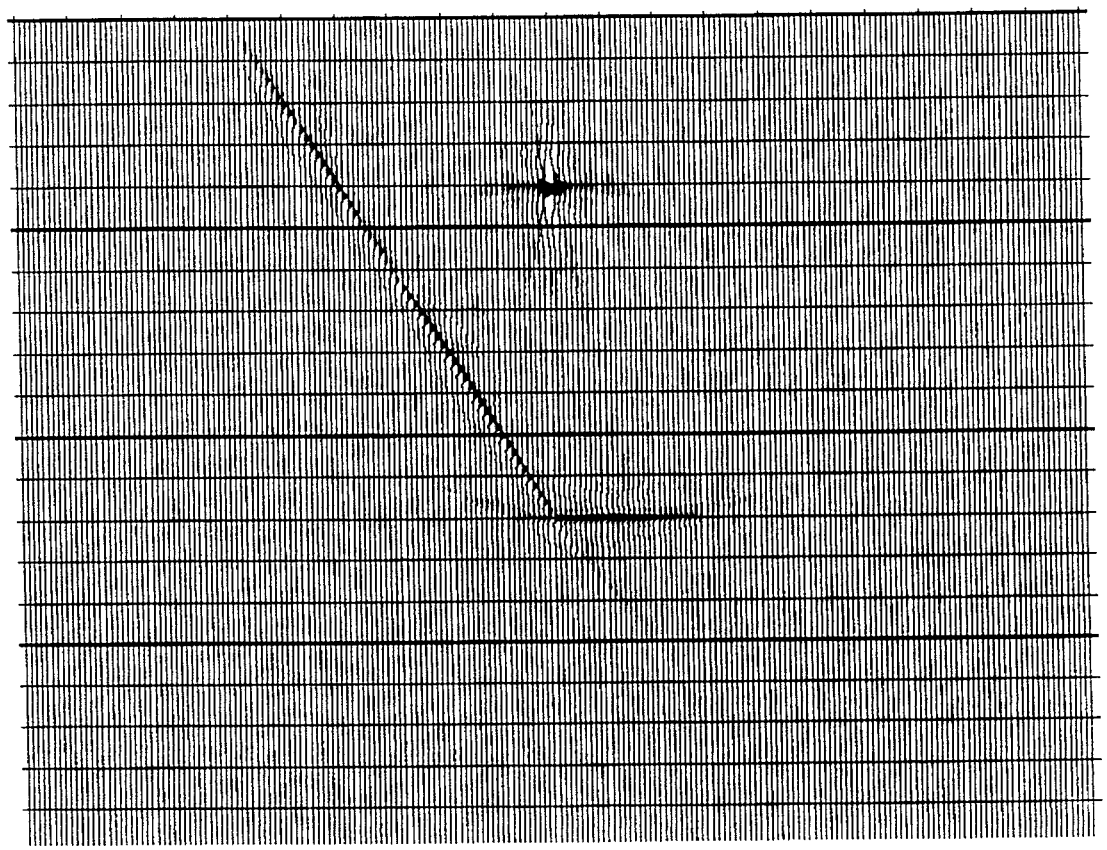

The model was used to create 101 source records which were collected into CSP gathers spanning the reflectors. One of these CSP gathers is shown in FIG. 7c at a location directly above the scatter point. The result of normal moveout applied to this CSP gather is shown in FIG. 7d. Note the horizontal alignment of energy for the scatter point and for the left end of the horizontal reflector. Stacking the NMO'ed CSP completes the prestack migration process, and this trace may be seen as the stacked trace is the central trace in FIG. 7e. The result of this equivalent offset migration compares identically with a full Kirchhoff prestack migration.

Figure 7F:
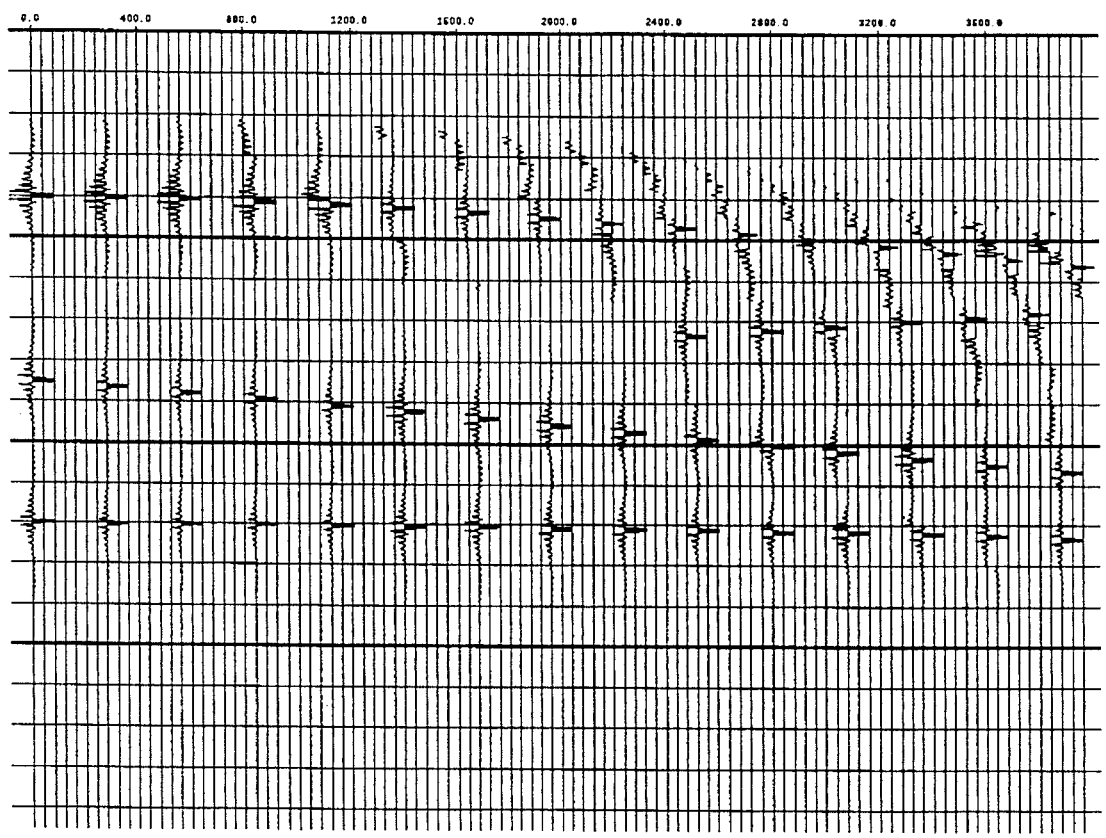

FIG. 7f shows a part of a CSP gather created from one source record located directly above the scatter point. The location of the CSP gather is also above the scatter point. A small offset interval helps to illustrate,the time-varying equivalent offset variations that may occur for input traces. The variations are most apparent at shallow times on the traces on the right side of the figure.

EXAMPLES

Land Environment

A land example is illustrated in FIGS. 8a-d, showing an example of (a) CMP; (b) CSP gathers and semblance; (c) DMO and post-stack migration; and (d) CSP migration.

Figure 8A:
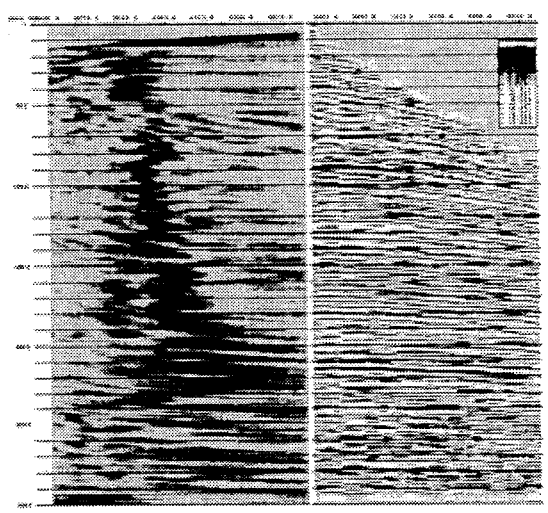
Figure 8B:
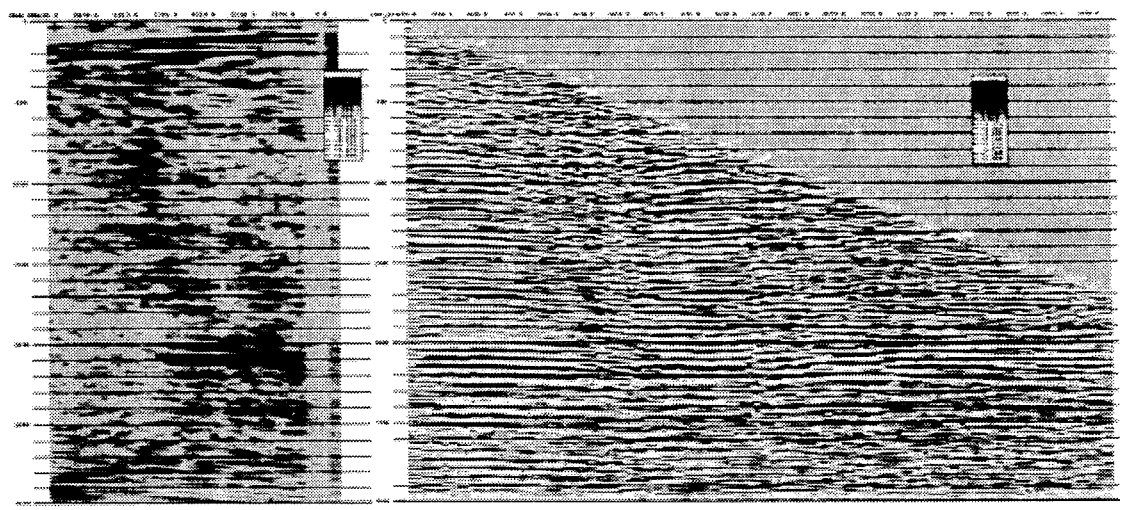
Figure 8C:
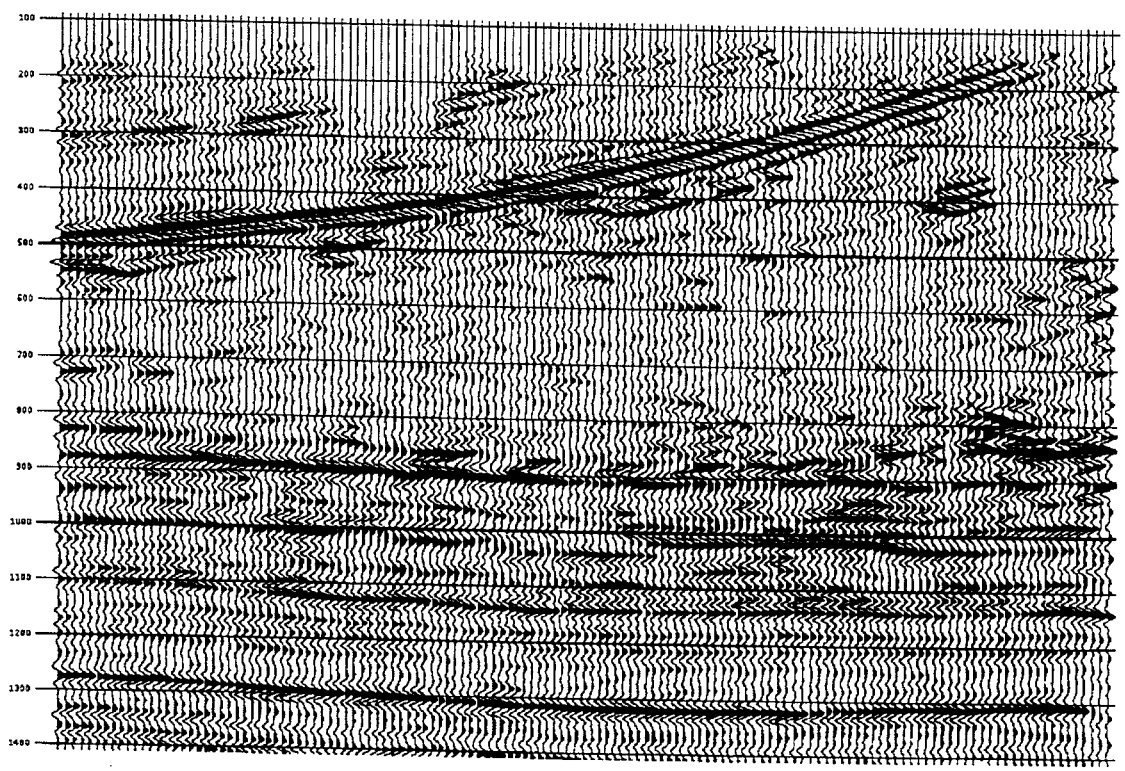
Figure 8D:
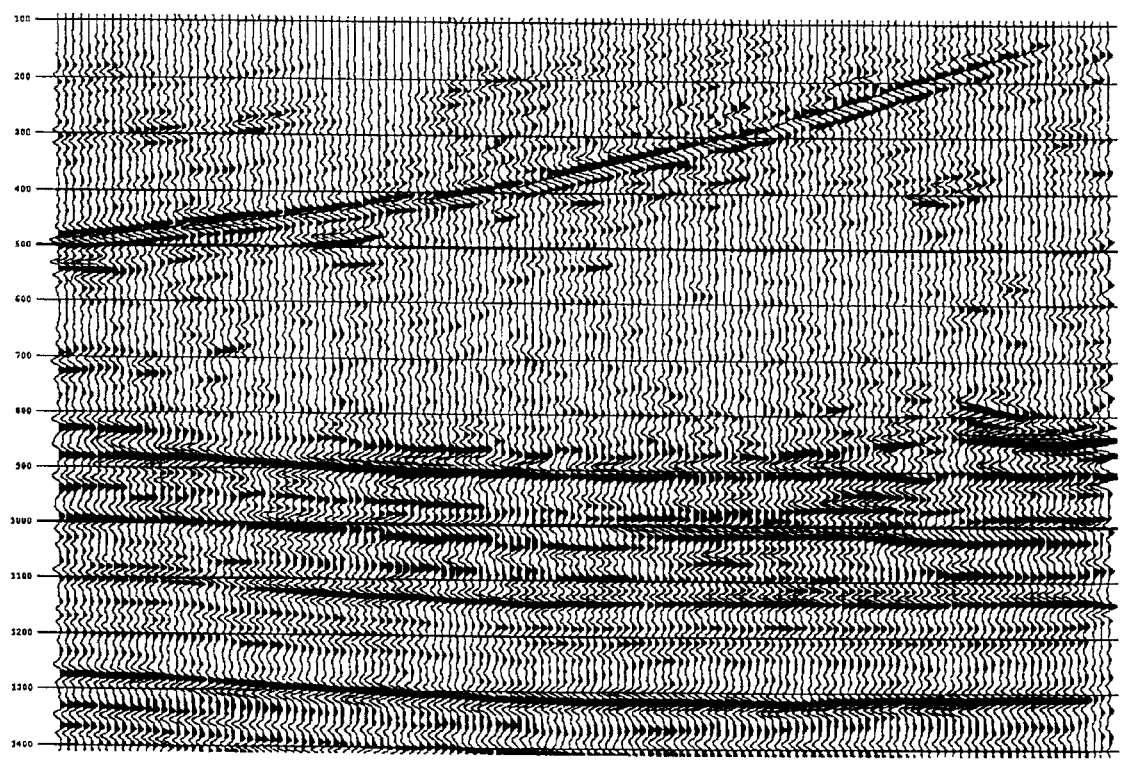
Figure 9A:
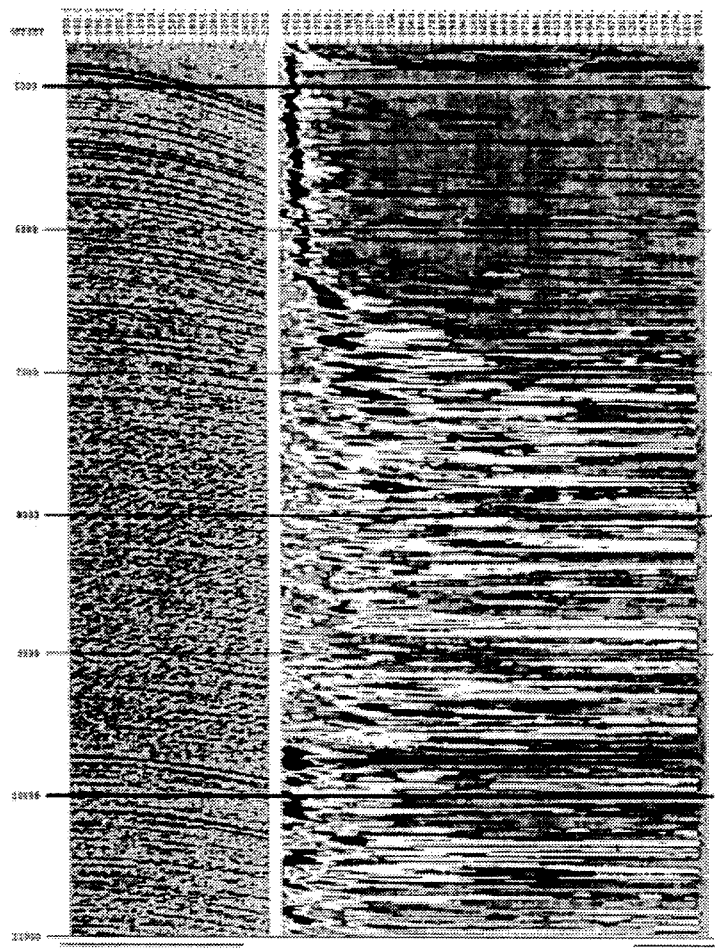
Figure 9B:
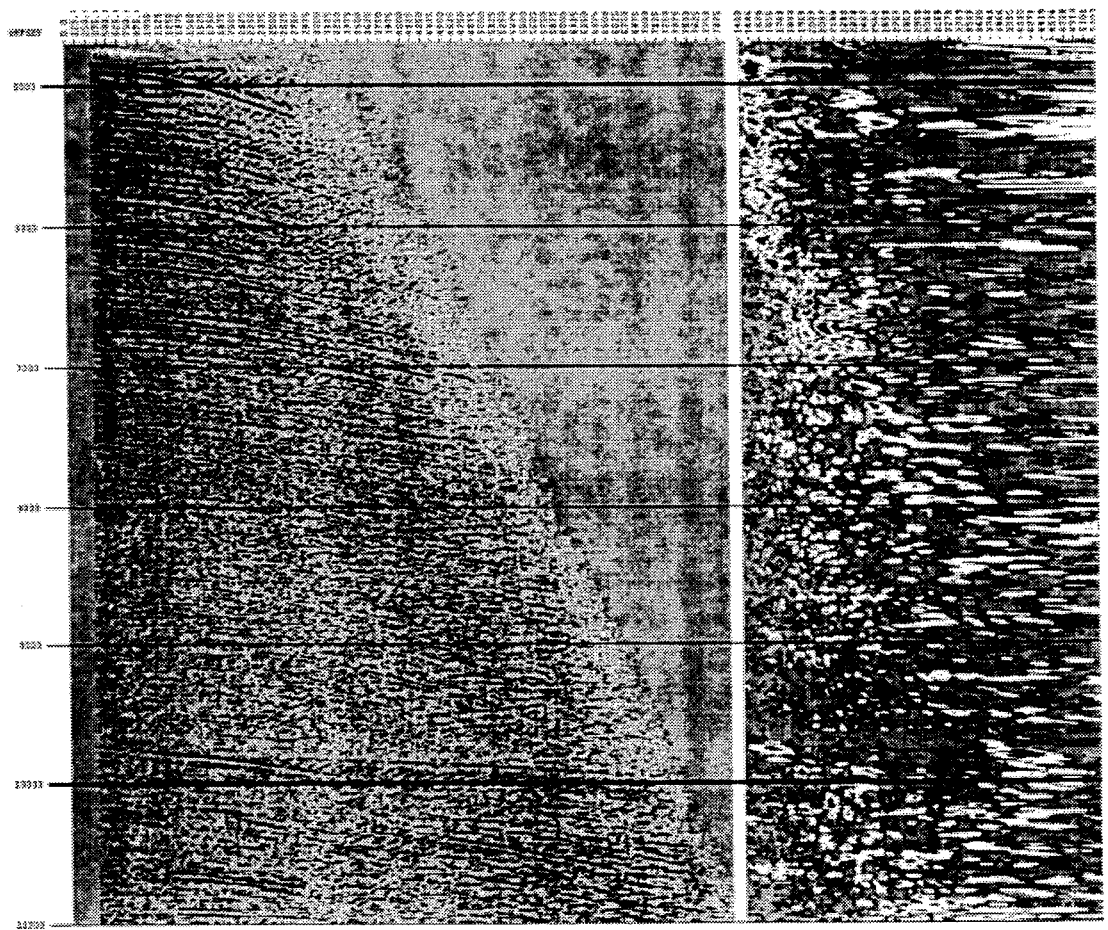
Figure 9C:
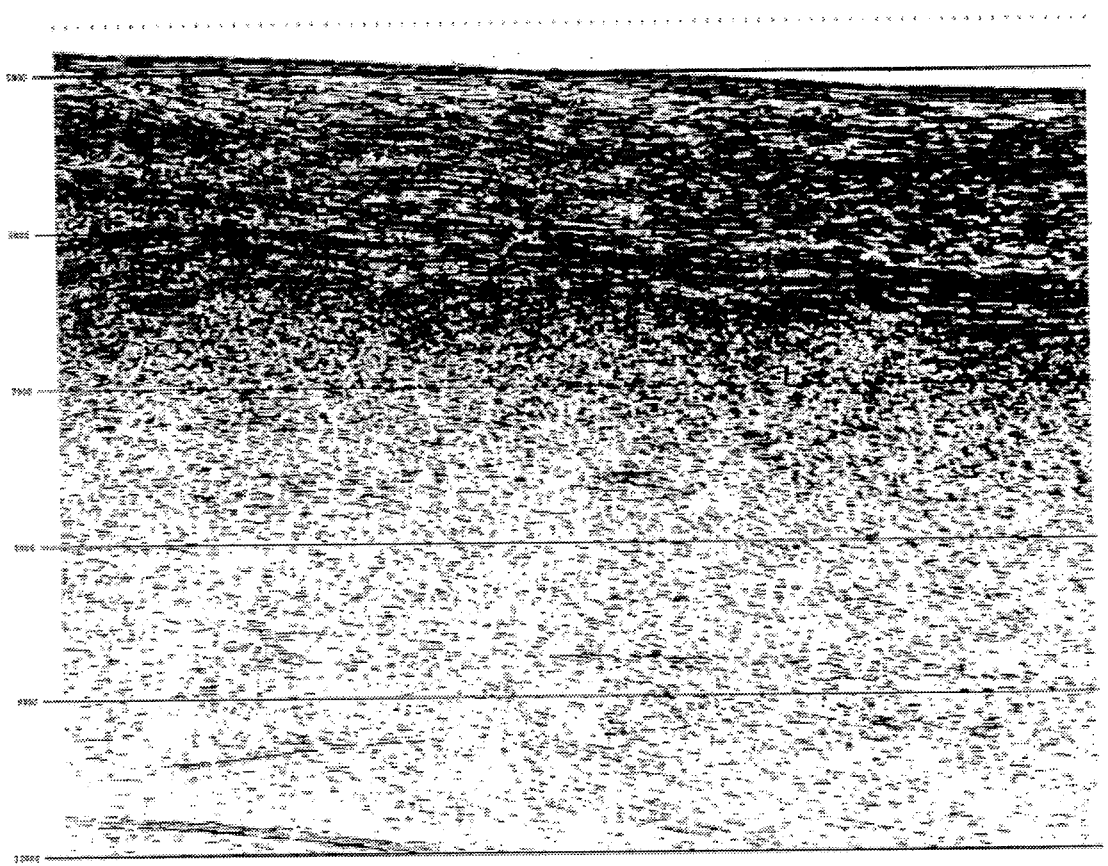
Figure 9D:

The real data example was acquired in the Foothills west of Calgary, Canada. This line was conventionally processed using DMO and post stack migration to obtain the best section. A CMP super gather and semblance plot are shown in FIG. 8a. A CSP gather and the corresponding semblance plot are shown in FIG. 8b. The final DMO and migrated section is shown in FIG. 8c, and the corresponding equivalent offset migration in FIG. 8d.

Note the improvement in the semblance of the CSP gather over the CMP super gather. The peaks of the velocities are more accurately defined. This enabled rapid picking of the velocities which significantly reduced the processing time. The statics solution derived from conventional processing of CMP gathers was used to create the CSP gathers.

EXAMPLES

Marine Environment

An example of a super CMP gather and a CSP gather from a marine line is shown in FIGS. 9a–d. The super CMP spanned eight CMP's to achieve full trace coverage in the offset bins. The CSP gather is displayed as a two sided plot and has an average fold of fifteen. The CSP gather was formed using $h_{e\delta}$ at a constant equivalent offset for each input trace. Consequently, the CSP gather is independent of time and velocity, and thus not limited by the constraints of prestack time migration.

The CSP gather shows many coherent reflections that extend to far offsets, along with other reflections hat become visible at offsets beyond the range of the CMP gather. High order NMO equations may be required to obtain optimum migration of this data.

In summary, the prestack migration method of the present invention is simpler and faster than conventional methods. The method of the present invention modifies the conventional Kirchhoff prestack time migration process by gathering, performing NMO, and stacking. The present method correctly maps energy from prestack traces to equivalent offsets in common scatter point (CSP) gathers. Conventional velocity analysis tools may be used on the CSP gathers to accurately determine RMS velocities.

We claim:

1. A method of obtaining a common scatter point gather for determining properties of an interior portion of a body having a plurality of scatter points, comprising the steps of:
   (a) retrieving a plurality of input races where each input trace is a sequential record of energy originating from a source and reflecting from the scatter points to a receiver, each one of said input traces having a plurality of data samples representing energy amplitudes;
   (b) defining a common scatter point location a point within an area of interest, said common scatter point location represents a subset of the scatter points proximate to the common scatter point location;
   (c) defining a common scatter point gather for said common scatter point location based on geometry of the source and the receiver for he input traces relative to the scatter point location, said common scatter point gather being defined by at least one of a plurality of time positions and a plurality of depth positions;
   (d) calculating a plurality of equivalent offset locations for said common scatter point gather based on: (i) geometry of the source and the receiver for each one of the input traces relative to said common scatter point location, (ii) position of the data samples in each input trace, and (iii) physical characteristics of the body, each one of said equivalent offset locations defining a distance between said common scatter point location and a location of a generally collocated model source and model receiver where travel time from said source to a selected one of said scatter points to said receiver is approximately equal to the travel time from the model source to said selected scatter point to the model receiver; and
   (e) mapping each one of the data samples of the input traces to the equivalent offset locations in said common scatter point gather for said common scatter point location, wherein said common scatter point gather defines properties of the interior of the body.

2. The method according to claim 1, wherein steps (c), (d) and (e) are repeated for a predetermined number of common scatter point gathers.

3. The method according to claim 2, wherein steps (b), (c), (d), (e) are repeated for a predetermined number of common scatter point locations.

4. The method according to claim 1, further including the step of dividing the plurality of equivalent offset locations of the common scatter point gather into a finite number of offset bins, wherein a selected one of said offset bins gathers the mapped data samples within a range of equivalent offsets in a neighborhood of said selected offset bin.

5. The method according to claim 1, further including the step of dividing the plurality of time positions of the common scatter point gather into a finite number of time bins, wherein a selected one of said time bins gathers the mapped data samples within a range of time in a neighborhood of said selected time bin.

6. The method according to claim 1, further including the step of dividing the plurality of depth positions of the common scatter point gather into a finite number of depth bins, wherein a selected one of said depth bins gathers the mapped data samples within a range of depth in a neighborhood of said selected depth bin.

7. The method according to claim 4, further including the step of forming traces, wherein each trace is a sequential ordering of the mapped data samples in time.

8. The method according to claim 7, wherein the data samples of the input traces are summed directly into the appropriate equivalent offset bin trace in the common scatter point gather at the same time position as the position of the samples in the input trace.

9. The method according to claim 1, wherein prior to the step of mapping input traces to equivalent offset locations in the common scatter point gather each of plurality of input traces are scaled, deconvolved, filtered, and time shifted.

10. The method according to claim 1, wherein the plurality of input traces are sorted based on azimuth of source and receiver locations relative to the common scatter point location prior to forming an azimuth limited common scatter point gather.

11. The method according to claim 1, wherein each of the equivalent offset locations $h_e$ for data samples at time T in the input traces with the source located at distance $h_s$ and the receiver located at distance $h_r$ from the common scatter point location are calculated based on the following:

$$h_e^2 = x_{off}^2 + h^2 - \left(\frac{2x_{off}h}{TV_{rms}}\right)^2$$

where the half source/receiver offset h and the source-receiver common midpoint to the common scatter point location distance $x_{off}$, are defined by:

$$h = \frac{||h_s| - |h_r||}{2} \text{ and } x_{off} = \frac{|h_s| + |h_r|}{2}$$

where migration velocity $V_{rms}$ is defined at time $_{1/2}T_0$ relative to the common scatter point location independent of source and receiver locations.

12. The method according to claim 9, wherein the step of mapping the data samples from each one of the input traces to the equivalent offset location in said common scatter point gather includes the following steps:

(a) determining the equivalent offset $h_{e0}$ and time sample $T(m)$ that correspond to a scatter point at $T_0=0$, i.e. $h_{e0} = x_{off}$ and $T(m) = 2x_{off}/V_{rms}(0)$;

(b) determining the equivalent offset bin trace n with equivalent offset $h_e(n)$ closest to $h_{e0}$;

(c) calculating the largest offset of the equivalent offset bin trace n located at $h_e(n)$ denoted as the bin boundary $h_e(n^+)$ by adding half of the bin range $\delta h$ to $h_e(n)$;

(d) calculating $T(m^+)$ based on the following:

$$T(m^+) = \frac{(2x_{off}h)}{V_{rms}(T_0)[x_{off}^2 + h^2 - h_e^2(n^+)]^{1/2}} ;$$

(e) copying the data samples of the input trace from $T(m)$ to $T(m^+)$ to the equivalent offset bin trace at $h_e(n)$;

(f) calculating the smallest offset of the equivalent offset bin trace n+1 located at $h_e(n+1)$ denoted as the bin boundary $h_e(n+1^-)$ by subtracting half of the bin range $\delta h$ from $h_e(n+1)$;

(g) calculating $T(m+1^-)$ based on the following:

$$T(m+1^-) = \frac{(2x_{off}h)}{V_{rms}(T_0)[x_{off}^2 + h^2 - h_e^2(n+1^-)]^{1/2}} ;$$

(h) calculating $h_e(n+1^+)$, and $T(m+1+)$ by steps (c) and (d);

(i) copying the data samples of the input trace from $T(m+1^-)$ to $T(m+1^+)$ to the equivalent offset bin trace at $h_e(n+1)$; and (j) repeating steps (f), (g), (h) and (i) un all possible samples of the input trace are copied to an equivalent offset bin trace.

13. The method according to claim 1, wherein normal moveout is applied to the common scatter point gather and all data samples at a constant time in the common scatter point gather summed to form a single output migrated time sample at the common scatter point location.

14. The method according to claim 1, wherein normal moveout is applied to the common scatter point gather and all data samples at a constant depth in the common scatter point gather summed to form a single output migrated depth sample at the common scatter point location.

15. The method of claim 1, wherein the step of calculating the plurality of equivalent offset locations $h_e$ for the common scatter point location on a datum plane with travel time $T_0$ to a scatter point comprises the following steps, for a rugged topography geometry:

(i) defining a first datum time for a source as $t_s$ relative to said datum plane;

(ii) defining a second datum time for a receiver as $t_r$, relative to said datum plane;

(iii) migrating the data samples from said first datum time to said second datum time;

(iv) calculating velocity $V_{srs}$ of the source from a first datum elevation, wherein the velocity at the first datum elevation at said common scatter point location is defined by $V_{srs}(T_0+t_s)$, and calculating velocity $V_{rec}$ of the receiver from a second datum elevation, wherein the velocity at the second datum elevation at said common scatter point location is defined by $V_{rec}(T_0+t_r)$;

(v) calculating total travel time T as the sum of the travel time $T_s$ from the source to the scatter point and the travel time $T_r$ from the scatter point to the receiver, with the source location at distance $h_s$ and the receiver located at distance $h_r$ from the common scatter point location, where:

$T = T_s + T_r$, and $$T = \left( (T_0+t_s)^2 + \frac{h_s^2}{V_{srs}^2(T_0+t_s)} \right)^{1/2} + \left( (T_0+t_r)^2 + \frac{h_r^2}{V_{rec}^2(T_0+t_r)} \right)^{1/2}$$

(vi) equating said travel time T to twice a travel time from a collocated source and receiver located on the datum plane to the scatter point defined by:

$$T = 2\left( T_0^2 + \frac{h_e^2}{V^2(T_0)} \right)^{1/2} \text{ rearranged as}$$

$$h_e^2 = V^2(T_0)\left( \frac{T^2}{4} - T_0^2 \right)$$

(vii) calculating the velocities $V_{srs}$ for a source ray path and $V_{rec}$ for a receiver raypath based on the velocity V at the scatter point and with a replacement velocity $V_{rep}$, wherein:

$$V_{srs}^2(T_0+t_s) = \frac{T_0 V^2(T_0) + t_s V_{rep}^2}{T_0 + t_s} \text{ and}$$

$$V_{rec}^2(T_0+t_r) = \frac{T_0 V^2(T_0) + t_r V_{rep}^2}{T_0 + t_r} .$$

16. The method of claim 1, further including the step of forming an unmigrated image wherein the data samples in the common scatter point gathers contain zero offset information required to migrate the energy to the trace at the common scatter point gather.

17. The method of claim 16, further including the steps of sorting in azimuth a plurality of energy vectors in the common scatter point gathers; and rotating said plurality of energy vectors back to a zero offset plane to form an unmigrated zero offset stacked section.

* * * * *